United States Patent Office 3,190,798
Patented June 22, 1965

3,190,798
ANTHELMINTIC COMPOSITION AND METHOD OF USING SAME
Sydney M. Ehrlich, deceased, late of New Rochelle, N.Y., by Hannah Ehrlich, New Rochelle, N.Y., and H. Sheldon Kaufman, executors, Forest Hills, N.Y., assignors to The Selney Company, Inc., a corporation of New York
No Drawing. Filed Oct. 31, 1962, Ser. No. 234,563
2 Claims. (Cl. 167—53)

The present invention relates generally to chemotherapy and it relates more particularly to an improved method and composition for combating helminth infections employing piperazine fumarate.

It is well recognized that piperazine and compounds thereof are highly effective in the treatment of helminth infections both in man and animals. While the piperazines are most commonly administered orally, they also may be rectally administered by enema and the like. The mechanism of the piperazines' activity is thought to be the result of the narcotizing effect thereof on the worms in the intestinal tract and the normal peristaltic activity and eliminating processes are relied on to dislodge and expel the stunned and weakened worms.

While it is the piperazine moiety that possesses the anthelmintic activity, it is the compounds of piperazine that are most commonly employed. Piperazine has a highly undesirable and unacceptable taste, is very hygroscopic, cakes easily, and is difficult to handle, dispense and administer. The compounds of piperazine have thus been resorted to, but those heretofore proposed and employed, while avoiding some of the drawbacks of the piperazine base, have introduced other disadvantages. Thus, for example, the dihydrochloride tartrate and citrate compounds thereof are highly water soluble and hence hygroscopic and thus subject to caking. Piperazine adipate and piperazine phosphate, although of relatively low water solubility, like the other piperazine compounds employed as anthelmintic, contain as a major constituent a moiety which merely adds additional bulk and does not serve any useful pharmacological purpose. For example, piperazine constitutes only 37% of piperazine adipate and 42.8% of piperazine phosphate in its normal hydrated state and in both cases the addition radical, that is the adipate and the phosphate, does not assist or contribute in combating the helminth infection.

It is, therefore, a principal object of the present invention to provide an improved chemotherapeutic method and composition.

Another object of the present invention is to provide an improved method for combating helminth infections.

Still another object of the present invention is to provide an improved anthelmintic agent.

A further object of the present invention is to provide an improved composition for combating helminth infections characterized by its acceptability, stability, low cost, ease of administration, dispensing and handling and the absence of moieties which do not contribute to the combating of the helminth infection.

The above and other objects of the present invention will become apparent from a reading of the following description in which examples of the present invention are given merely by way of illustration and are not intended to limit the scope of the present invention.

The present invention contemplates the application of piperazine fumarate in the treatment of helminth infections. Piperazine fumarate possesses the physical and pharmacological properties highly desirable in an anthelminth, It can be prepared as a free flowing powder and has a relatively low water solubility, ~4% at 20° C. and is relatively non-hygroscopic and free of caking. The piperazine content is relatively high, 42.8% and the remaining moiety, the fumarate, which is present in the amount of 57.2%, serves the very important function of a laxative to promote and increase peristaltic activity and thereby accelerate the elimination of the narcotized helminth. In addition, ratio of the optimum dosages of the piperazine to the fumarate for their respective functions is of the same order as the ratio of the corresponding moieties in the piperazine fumarate. Thus, as an anthelminth, piperazine fumarate is highly superior to those heretofore employed and lacks the many drawbacks and disadvantages of the earlier anthelminths.

The piperazine fumarate may be prepared according to the following example which is given merely by way of illustration:

97 parts of piperazine hexahydrate (0.5 mol) and 58 parts of fumaric acid (0.5 mol) are added to 200 parts of water in a glass or stainless steel reactor. The mixture is cooked at 90° to 100° C. with stirring until the bulk of the material enters into solution and the pH drops to between 5.0 and 5.5. The solution is cooled to obtain a precipitate which is then centrifuged and dried. The yield of the resulting piperazine fumarate was 97 parts as compared to a theoretical yield of 101 parts and the product had a melting point of 262 to 264°. On further concentration of the mother liquor, additional material is obtained having a lower melting point.

In employing the piperazine fumarate in combating helminth infections it may be administered, preferably orally, in similar dosages and along similar schedules usually recommended in the corresponding application of the piperazines, depending on the piperazine contents of the respective compounds, except that with the use of the present piperazine fumarate the extent of the administration is decreased. Furthermore, similar manners of administration may be employed. Thus, in the treatment of helminth infections in animals such as livestock, fowl and pets, the piperazine fumarate may be mixed with the food or feed or dissolved in the drinking water. The unit administered dosage is advantageously between 20 and 200 milligrams per pound of body weight of the subject and preferably about 50 milligrams per pound of body weight. Thus, as feed additive for pigs and chickens, the piperazine fumarate is added to the feed at about between 0.2 and 1.0%, preferably at about 0.5%, of the weight thereof, whereas when dissolved in the drinking water about half of the above percentage is added.

The piperazine fumarate may also be orally administered as a powder at full strength or admixed with a suitably pharmacologically acceptable carrier. It may be advantageously put up for human application in discrete units as pills, tablets, capsules or the like in accordance with conventional pharmaceutical practices, well known binders and carriers being used. The discrete units advantageously each contain between 250 and 750 milligrams of the piperazine fumarate and may be singly or severally administered as a single dosage.

While there have been described and illustrated preferred embodiments of the present invention it is apparent that numerous alterations, omissions and additions may be made without departing from the spirit thereof.

What is claimed is:

1. A composition for combating helminth infection in aminals comprising a feed having a piperazine fumarate admixed therewith in an amount between 0.2 and 1.0% by weight of said feed.

2. The method of combating helminth infection in an animal comprising orally administering to said animal between 20 and 200 milligrams of piperazine fumarate per pound of body weight of said animal.

References Cited by the Examiner

Merck Index, seventh edition, 1960, Merck and Co., Rahway, N.J., pages 1012 and 1013.

Prigot, J.A.C.S., vol. 70, August 1948, pages 2758–2759.

Merck Index, seventh edition, 1960, Merck and Co., Rahway, N.J., page 822.

JULIAN S. LEVITT, *Primary Examiner.*

FRANK CACCIAPAGLIA, JR., LEWIS GOTTS,
*Examiners.*